US006846857B1

(12) United States Patent
Lindner

(10) Patent No.: US 6,846,857 B1
(45) Date of Patent: Jan. 25, 2005

(54) LONG FIBER-REINFORCED THERMOPLASTICS MATERIAL AND A METHOD FOR PRODUCING THE SAME

(75) Inventor: Mathias Lindner, Kaiserslautern (DE)

(73) Assignee: Fact Future Advanced Composites & Technology, GmbH, Kaiserslautern (DE)

( * ) Notice: Subject to any disclaimer, the term of this patent is extended or adjusted under 35 U.S.C. 154(b) by 94 days.

(21) Appl. No.: 10/019,601

(22) PCT Filed: Jun. 9, 2000

(86) PCT No.: PCT/DE00/01928

§ 371 (c)(1),
(2), (4) Date: May 3, 2002

(87) PCT Pub. No.: WO01/02471

PCT Pub. Date: Jan. 11, 2001

(30) Foreign Application Priority Data

Jul. 6, 1999 (DE) .......................... 199 30 920

(51) Int. Cl.[7] .............................................. C08K 11/00

(52) U.S. Cl. .............................. 524/9; 524/492; 524/11

(58) Field of Search ................................ 524/492, 494, 524/496, 9, 11

(56) References Cited

U.S. PATENT DOCUMENTS

| 5,114,992 A | * | 5/1992 | Hanley .......................... 523/217 |
| 5,165,941 A | * | 11/1992 | Hawley ......................... 425/148 |
| 5,185,117 A | * | 2/1993 | Hawley ................... 264/211.12 |
| 5,362,431 A | * | 11/1994 | Guerrini et al. ............. 264/131 |
| 5,866,648 A | * | 2/1999 | Saito et al. ................... 524/494 |
| 6,090,319 A | | 7/2000 | Sharma et al. |
| 6,221,951 B1 | * | 4/2001 | de Wit et al. ................ 524/494 |

FOREIGN PATENT DOCUMENTS

| EP | 0 55 950 A | 8/1973 |
| EP | 0 737 706 A | 10/1996 |
| JP | 63289034 | 11/1998 |
| WO | WO 99/60049 | 11/1999 |
| WO | WO 99/65661 | 12/1999 |

* cited by examiner

*Primary Examiner*—Katarzyna Wyrozebski
(74) *Attorney, Agent, or Firm*—Paul & Paul

(57) ABSTRACT

This invention relates to a long fiber-reinforced thermoplastic material and to a method for producing long fiber-reinforced thermoplastics. According to said method, the fibers are impregnated with a first thermoplastic material. Since the matrix of the material consists of at least two different thermoplastics, the fibers being essentially only wet by one of the two thermoplastic materials, the material is considerably more variable in terms of the mechanical and other physical properties that can be obtained than known thermoplastic, long fiber-reinforced materials.

19 Claims, 1 Drawing Sheet

Figure 1:
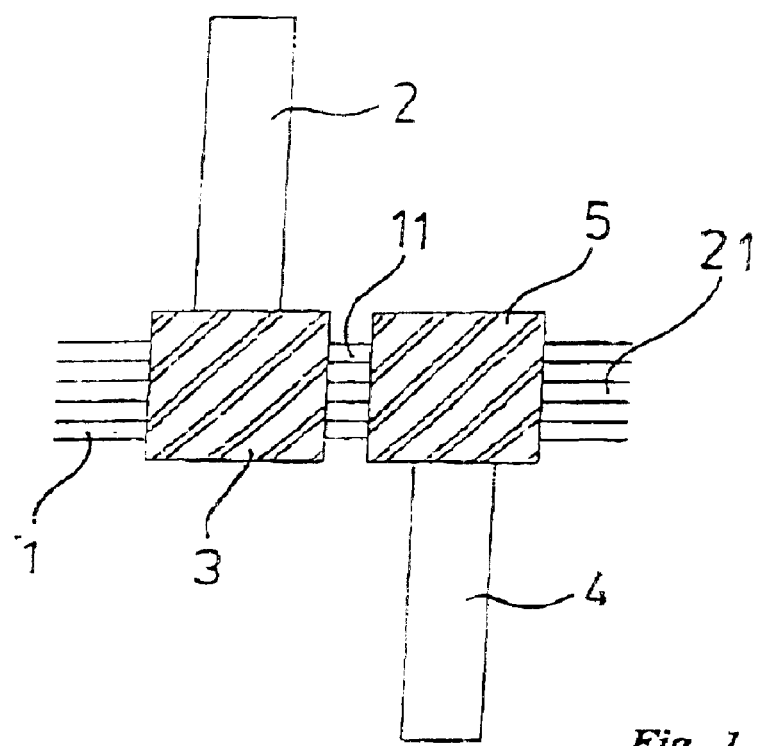

LONG FIBER-REINFORCED THERMOPLASTICS MATERIAL AND A METHOD FOR PRODUCING THE SAME

The present invention relates to a long-fibre reinforced thermoplastics material and a method for the production of long-fibre reinforced thermoplastics, wherein the fibres are impregnated with a first thermoplastics material.

Corresponding materials and methods for their production have long since been known.

In this domain, the term, "long-fibres" generally denotes fibres of at least 1 mm in length, and preferably in the order of 5 mm or above. Such fibre materials, also called composite materials, have meanwhile been used in a multiplicity of ways in the domain of mechanical structural members where low weight, and, for example, high mechanical strength, electrical insulating property, or a low or high thermal conductivity should be combined together. For example, glass fibre- or carbon fibre-reinforced plastics are generally known for use with components subjected to both light and heavy mechanical loads, e.g. aircraft carrier surfaces, ships' hulls, golf club shafts, technical injection moulded components, and the like.

Long-fibre reinforced, thermoplastics materials are often also made in the form of semi-finished or half-finished goods, by a thermoplastic being mixed with corresponding fibres, for example, or by fibres being impregnated with a thermoplastics plastics material, whereupon the material produced in this way is then broken into pellets or a granulate which is then used as a raw material for the production of larger sized components. To that end, the pellets or granulate particles are melted, cast into a mould, or applied to surfaces, and combined together in this way.

However, the combinations of materials which have been available hitherto for these long-fibre reinforced thermoplastics have been relatively limited. This is connected, amongst other things, with the fact that certain fibres cannot be impregnated with any thermoplastics plastics material without further ado, so that the plastics material adheres to the fibres only very poorly, something which is however an important requirement for the production of the desired combined properties of such composite materials. In this respect, the long-fibres should ensure a relatively high degree of tensile strength, whilst, on the other hand, the thermoplastics plastics material contributes advantageous shaping capability, elasticity and other desirable properties, e.g. resistance to corrosion, resistance to temperatures, and general chemical resistivity.

Some properties, e.g. a good surface, can however only be produced with very great difficulty with conventional long-fibre reinforced thermoplastics, and generally require bonding with additional layers of material which produce good surfaces.

The chemical resistivity and resistance to temperature of these thermoplastics which have proven their worth hitherto for the impregnation of long-fibres in most cases leave much to be desired.

In the face of this prior art, the aim of the present invention is to create a long-fibre reinforced thermoplastics material and a method for the production of same, which offers a considerably broader possibility for variation in respect of the mechanical, other physical, chemical and electrical properties attainable, than has been the case with previously known thermoplastics, long-fibre reinforced materials.

With respect to the long-fibre reinforced thermoplastics material itself, the problem forming the basis of the invention is solved in that the matrix of the material consists of at least two different thermoplastics, wherein the fibres are wetted essentially by only one of the two thermoplastics materials.

This means that preferably at least 80% of the fibres, or fibre surfaces, are wetted with the first of the two thermoplastics materials.

This is advantageous in that one operational step, namely mixing or "blending" in an extruder, or similar machine, is abandoned.

In this way, it is possible to impregnate, or mix, the fibres with a first thermoplastics material which has a good wetting capability and impregnation capability for the fibres in question. The second thermoplastics material can then, if necessary, be selected with a view to the physical or chemical properties desired for the end product. For example, the second thermoplastics material can be one which has a high resistance to temperature, a greater compressive strength, or, generally, mechanical strength, a better electrical insulation capability, or, optionally, also conductivity, or better resistance to certain chemicals. Depending upon the proportion of the second thermoplastics material, its advantageous properties can then be decisive for the end product, whereas the fibres impregnated with the first thermoplastics material contribute to a very good tensile strength and thus a high mechanical loading capacity for the material. As far as the second thermoplastics material is concerned, it is possible to select one which may have a very poor impregnation capability or wetting capability for the fibres, but which can combine easily and relatively well with the first thermoplastics material. The result is then a material which combines the advantageous properties of long-fibre reinforcement with those of the second thermoplastics material, wherein the first thermoplastics material essentially only forms the binding member between the fibres and the second thermoplastics material.

It will be appreciated that consequently the material which can be considered primarily for the second thermoplastics material is one which has a poor impregnation capability or wetting capability for the fibres present in the material. If the impregnation capability or wetting capability were as good as, or even better than, the first thermoplastics material, then the fibres could also be encased or coated directly with the second material, and there would be no need to combine two thermoplastics materials, In any case, the special mixture, which is homogeneous to a greater or lesser extent, of two thermoplastics materials can also have new advantageous properties which neither of the two materials per se has, and so basically the joint use of two thermoplastics materials as a matrix for long-fibres should be encompassed by the basic concept of the present invention, even if each of the individual materials per se has a good wetting- and impregnation capability for the fibres.

The fibres contained in the material are, in particular, glass-, carbon-, aramide- or natural fibres, wherein the latter include materials like flax, hemp or jute, for example, and wherein mixtures of all the afore-mentioned fibre materials can also be used.

Clearly, in view of the foregoing statements, it is expedient if at least one of the thermoplastics materials, referred to here as the "first" thermoplastics material, is a material which wets the fibres well, wherein the material is preferably selected from the group consisting of polypropylene, polyamide (polyamide 6, polyamide 66, polyamide 12, polyamide 46), polyethylene, acrylonitrile/butadiene/styrene copolymers, polyphenylene sulphide, polystyrene, and polyether-ether ketone.

Advantageous properties of the material are also obtained if the, at least two, thermoplastics materials contained in the material are poorly miscible, or immiscible, and form an inhomogeneous mixture. Therein, it will be appreciated that the inhomogeneities should be relatively low. i.e. the sizes of inhomogeneous areas should be less than the typical length of the fibres. In this way, it is possible for the fibres which are wetted well by each respective one of the materials to bridge inhomogeneous areas in which the respective other thermoplastics material with a poor wetting capability substantially prevails. In this way, the advantageous properties provided by the tensile strength of the fibres are maintained, whilst, at the same time, the advantageous properties of the thermoplastics material which does not combine as well with the fibres are maintained in the material. In order to obtain a favourable ratio between the fibres which contribute to a first part of the desired properties of the material, and the second thermoplastics material which is intended to provide the rest of the advantageous properties, a variant of the invention is preferred, wherein the proportion of a first material which wets the fibres well makes up between 10 and 40% of the matrix material.

In a preferred embodiment of the invention, it is provided that the first material is polypropylene and the second material is a high-quality polyamide, such as PA66, for example, wherein the polypropylene proportion is between 10 and 40% and the PA-proportion is accordingly between 60 and 90%.

It can also be expedient if the material contains a compatibility component which increases the bonding between the various matrix materials and/or their miscibility. In this way, a more favourable bonding of the two poorly miscible materials is obtained, and thus greater homogeneity, so that even relatively short fibres in the region of between 1 and 5 mm in length can be used which bridge the correspondingly small inhomogeneous areas without further ado.

With respect to the method for the production of long-fibre reinforced thermoplastics, wherein the fibres are impregnated with a first thermoplastics material, the problem which solves the basis of the invention is solved in that the fibres which have already been impregnated are impregnated again, or nixed, or encased, with a second thermoplastics material which is different from the first material.

This method permits combination of the properties of fibres with thermoplastics materials (which are not very suitable per se for direct bonding), without a working step in which the thermoplastics are mixed together being necessary.

Expediently, the length of the fibres to be impregnated is preferably at least 3, or particularly preferably, more than 6 mm. The fibres can be supplied in the form of a skein of fibres of essentially longitudinal orientation, but also in the form of a fibre matting of fibres matted together, or also simply in the form of a fibre mixture of randomly oriented fibres. In one variant of the method according to the invention, the fibres are initially extruded onto, or encased around, the first thermoplastics material, and following solidification of the thermoplastics material, possibly also a shaping step in order to extrude all of the material, e.g. in a skein of constant cross-section, it can then be impregnated again as a skein with the second thermoplastics material. However, in most applications, an embodiment of the production process is preferred, wherein following solidification and possible shaping the material occurring (initially in the form of a skein) is broken up into smaller sections, wherein the length of those sections corresponds at least in magnitude to the average length of the fibres, in order not to shorten the fibres present unnecessarily. However, if the fibres are particularly long, e.g. far greater than 6 mm, e.g. 25 mm, or are more or less continuous fibres, the sections into which the skein formed with the first thermoplastics material is broken up can also be shorter than the average fibre length. These broken up sections are then mixed with the second material, possibly with heating, and the mixed material is then subjected to a shaping operation.

A shaping process such as this generally takes place by extrusion, blow moulding or injection moulding. With some mixtures of thermoplastics materials, it can be expedient, if, after the first fibre reinforced material has been mixed with the second material (in a state below the melting point of the two materials) that mixture is brought to the melting point, or slightly above the melting point of the faster melting substance, for a short time only. This can, admittedly, result in the mixture not being completely homogeneous. However, it is sufficient if the inhomogeneous areas are small in size in comparison with the fibres, i.e. if, for example, conversely, relatively small areas are present in the material which consist of only one or the other of the thermoplastics materials, but if those areas have typical dimensions which are much less than the length of the fibres.

Figure 2:
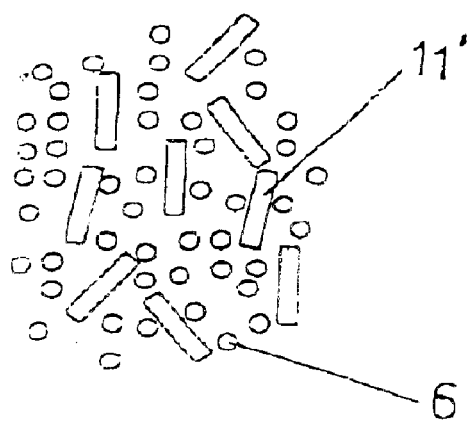

Further advantages, features and possible applications will become apparent from the following description of a preferred embodiment and the associated drawings, wherein:

FIG. 1 shows, schematically, a method for the production of long-fibre reinforced thermoplastics with a matrix consisting of different thermoplastics, and FIG. 2 shows, schematically, a mixture consisting of a long-fibre reinforced thermoplastics material with a second matrix.

FIG. 1, left, shows a fibre skein 1 which is guided through an extruder 2 by means of a feed device 3 for a first thermoplastics material, wherein the extruder 2 and the corresponding feed nozzle 3 are only shown roughly here, and the fibre skein 1 is likewise only shown schematically, and pass through the extruders 2 and 4 from left to right. After passing through the extruder 2 and feed nozzle 3, the fibre skein is impregnated, and will from now on be referred to as an impregnated fibre skein 11 which is guided through a second extruder 4 with a second feed nozzle 5, so that the fibre skein 11 impregnated with the first thermoplastics material is encased with the second matrix, or the second matrix is applied to the impregnated skein 11, and then emerges from the extruder 4 as a ready fibre skein 21. This procedure is recommended above all if it is supposed that the bond between the two thermoplastics is poor and does not form a homogeneous mixture of plastics materials, so that during the extrusion or encasement operation with the second matrix, an optimum bond can already be achieved between the two thermoplastics.

FIG. 2 shows a long-fibre reinforced thermoplastics material with two matrices, which is produced somewhat differently from the thermoplastics material 21 shown schematically in FIG. 1. In this case, following the first impregnation and extrusion step, the long-fibre reinforced material 11' occurring, which consists only of the fibres and one first thermoplastic material, is broken doff into pellets in the form of little rods, and these pellets, or little rods, consisting of the material 11' are then mixed with a second thermoplastics material 6, as shown schematically in FIG. 2. This mixture can then be heated again, and possibly also be extruded in order to produce a thorough bond between the fibre reinforced first thermoplastics material 11' and the second matrix material 6. Therein, the final material occurring can indeed be inhomogeneous, and essentially contain the structure of FIG. 2 (generally without any air gaps), wherein the fibres in the pellets 11' bridge the inhomogeneous areas so that the material appears overall to be homogeneous on the macroscopic scale, i.e, with dimensions which are clearly greater than the length of the individual pellets 11', and has properties representing a combination of the properties of conventional fibre reinforced materials with properties of the second thermoplastics material, despite the fact that the second thermoplastics material considered per se does not bond, or bonds only poorly, with fibres, and therefore conventionally could not be produced as a long-fibre reinforced material.

I claim:

1. A process for manufacturing a long-fibre reinforced thermoplastic material comprising the steps of guiding a fibre skein through a first extruder, wherein the fiber skein is impregnated with a first thermoplastic material, guiding the impregnated fiber skein through a second extruder, wherein a second thermoplastic material is applied on the impregnated fibre skein and wherein the temperature applied during the second extruding is at least for a short time higher than the melting point of the thermoplastic material with the highest melting point, and wherein the fibers are wetted essentially by only one of the thermoplastic materials, which is present in the manufactured reinforced material with at least 10% by weight, and wherein the first and second extruders and the fibre skein are assembled sequentially.

2. A method according to claim 1, characterised in that the length of the fibres is on average at least 1 mm.

3. A method according to anyone of claims 1 or 2 characterized in that following impregnation of the fibers with the first thermoplastics material and following a shaping and solidification step, the material is broken up into smaller sections, the length of which corresponds in magnitude to the average length of the fibers, wherein these broken up sections are mixed with the second material possibly heated, and together subjected to shaping.

4. A method according to claim 3, characterised in that the shaping takes place by extrusion, blow moulding, or injection moulding.

5. A method according to claim 3, characterised in that following the mixing of the first, fibre reinforced material with the second material the mixture is increased to, or just slightly above, the melting point of the higher melting substance for a short time only.

6. A method according to claim 2, characterised in that the length of the fibres is on average at least 3 mm.

7. A method according to claim 6, characterised in that the length of the an 6 mm.

8. A long-fibre reinforced thermoplastic-material prepared by the process of claim 1, wherein the matrix of the material comprises at least two different thermoplastic-materials, and wherein the long-fibre reinforced thermoplastic material is obtained by impregnating a fibre skein by melt-extruding the first thermoplastic material onto the fibre skein and subsequently coating the impregnated fibre skein by melt-extruding a second thermoplastic material onto the impregnated fibre skein, wherein the temperature applied during the second extruding is at least for a short time raised above the melting point of the thermoplastic material having the higher melting point of the two thermoplastic materials, and wherein the fibres are wetted essentially by only one of the two thermoplastics materials, which is represented in the reinforced material with at least 10% by weight.

9. A material according to claim 8, characterised in that one of the substances of which the matrix consists has a poor impregnation capability or wetting capability with respect to the fibres which are present in the material.

10. A material according to claim 9, characterised in that the fibres which are contained in the material consist of glass-, carbon-, aramide- or natural fibres, selected from the group of flax, hemp or jute, or mixtures of the aforementioned fibre materials.

11. A material according to any one of claims 8 to 9 characterised in that it contains a material which wets the fibres well, and which is selected from the group consisting of polypropylene, polyamide, polyethylene, acrylonitrile/butadiene/styrene-copolymers, polyphenylsulphide, polystyrene and polyether-ether ketone.

12. A material according to any one of claims 8 to 9, characterised in that the second thermoplastic-substance does not wet the fibres directly or to a significant extent.

13. A material according to any one of claims 8 to 9 characterised in that the, at least two, thermoplastics materials contained therein are poorly miscible, or immiscible, and form an inhomogeneous mixture.

14. A material according to any one of claims 8 to 9, characterised in that the proportion of fibres in the first thermoplastics-material makes up more than 10% by weight.

15. A material according to any one of claims 8 to 9, characterised in that the proportion of a first material which wets the fibres well is between 10 and 40% of the matrix material.

16. A material according to any one of claim 8 to claim 9, characterised in that the first material is polypropylene and the second material is high-quality polyamide, wherein the proportion of PP is between 10 and 40% and the proportion of PA is accordingly between 60 and 90%.

17. A material according to any one of claims 8 to 9, characterised in that it contains a compatibility component which increases the bonding between the various matrix materials and/or the miscibility thereof.

18. A material according to claim 11, characterised in that the polyamide is selected from the group of polyamide 6, polyamide 66, polyamide 12 and polyamide 46.

19. A material according to one of claim 16, characterised in that the high-quality polymide is PA-66.

* * * * *

UNITED STATES PATENT AND TRADEMARK OFFICE
CERTIFICATE OF CORRECTION

PATENT NO. : 6,846,857 B1
DATED : January 25, 2005
INVENTOR(S) : Mathias Lindner It is certified that error appears in the above-identified patent and that said Letters Patent is hereby corrected as shown below:

Column 3,
Line 43, replace "nixed" with -- mixed --

Column 4,
Line 61, replace "doff" with -- down --

Column 5,
Line 27, replace "present" with -- represented --
Line 32, replace "anyone" with -- any one --
Line 50, claim 7 should read -- A method according to claim 6, characterised in that the length of the fibres is on average more than 6 mm. --.

Signed and Sealed this

Twenty-sixth Day of April, 2005

JON W. DUDAS
*Director of the United States Patent and Trademark Office*